United States Patent [19]
Peterson

[11] Patent Number: 5,531,061
[45] Date of Patent: Jul. 2, 1996

[54] SYSTEM AND METHOD FOR PACKAGING BALES OF HAY AND AN IMPROVED WRAPPING APPARATUS

[76] Inventor: Robert W. Peterson, 9545 Road "0" SW., Royal City, Wash. 99357

[21] Appl. No.: 179,031

[22] Filed: Jan. 6, 1994

Related U.S. Application Data

[63] Continuation-in-part of Ser. No. 52,333, Apr. 22, 1993, Pat. No. 5,433,058.

[51] Int. Cl.$^6$ .......................... B65B 53/00; B65B 27/12; B65B 61/06; B65B 63/00
[52] U.S. Cl. ................. 53/526; 53/529; 53/556; 53/588; 53/389.3; 53/133.8
[58] Field of Search ................... 53/526, 172, 556, 53/588, 210, 529, 389.3, 133.8; 100/13; 156/253, 522; 414/412

[56] References Cited

U.S. PATENT DOCUMENTS

| | | |
|---|---|---|
| 1,870,519 | 8/1932 | Leguillon . |
| 3,661,008 | 5/1972 | Fredreckson . |
| 3,807,132 | 4/1974 | Kamiya .................... 53/204 |
| 3,914,918 | 10/1975 | Laird ........................ 53/24 |
| 4,050,220 | 9/1977 | Lancaster et al. ............ 53/198 |
| 4,317,322 | 3/1982 | Lancaster et al. ............ 53/399 |
| 4,377,061 | 3/1983 | Olson et al. ............. 53/526 X |
| 4,549,388 | 10/1985 | Lancaster ................ 53/588 X |
| 4,553,374 | 11/1985 | Lancaster et al. ............ 53/465 |
| 4,555,017 | 11/1985 | Blackmore .............. 206/83.5 |
| 4,563,857 | 1/1986 | Bergling et al. ............. 53/399 |
| 4,593,518 | 6/1986 | Lancaster ................ 53/588 X |
| 4,599,939 | 7/1986 | Fleissner ...................... 100/2 |
| 4,608,807 | 9/1986 | Skripalle ..................... 53/399 |
| 4,676,048 | 6/1987 | Lancaster et al. ............ 53/399 |
| 4,676,153 | 6/1987 | Ast ............................. 100/7 |
| 4,691,497 | 9/1987 | Lancaster ............... 53/556 X |
| 4,712,354 | 12/1987 | Lancaster et al. ............ 53/399 |
| 4,718,335 | 1/1988 | Ast ............................. 100/3 |
| 4,718,336 | 1/1988 | Manro ...................... 100/3 |
| 4,730,436 | 3/1988 | Angelino ................... 53/170 |
| 4,738,079 | 4/1988 | Lancaster et al. ............ 53/450 |
| 4,763,574 | 8/1988 | Ast ........................... 100/98 |
| 4,765,120 | 8/1988 | Phillips .................. 53/556 X |
| 4,793,124 | 12/1988 | Anderson .................. 53/588 |
| 4,866,909 | 9/1989 | Lancaster, III et al. ....... 53/399 |
| 4,930,292 | 6/1990 | Focke et al. ................ 53/588 |
| 4,949,533 | 8/1990 | Bate ........................... 53/556 |
| 4,953,336 | 9/1990 | Lancaster, III et al. ....... 53/556 |
| 5,001,974 | 3/1991 | Gombos ...................... 100/4 |
| 5,003,752 | 4/1991 | Matsumoto ............. 53/588 X |
| 5,012,631 | 5/1991 | Hostetler et al. ............ 53/588 |
| 5,027,582 | 7/1991 | Dearwester ................ 53/399 |
| 5,090,177 | 2/1992 | Gombos et al. ............. 53/399 |
| 5,111,931 | 5/1992 | Gombos et al. .......... 206/83.5 |
| 5,140,800 | 8/1992 | Martin et al. ........... 53/556 X |
| 5,152,125 | 10/1992 | Lavar ......................... 53/588 |
| 5,155,970 | 10/1992 | Moore ....................... 53/399 |

FOREIGN PATENT DOCUMENTS

446015  9/1991  European Pat. Off. ............ 53/556

*Primary Examiner*—Linda Johnson
*Attorney, Agent, or Firm*—Wells, St. John, Roberts, Gregory & Matkin

[57] ABSTRACT

A system for packaging hay bales includes a press for compressing hay to small, compact bales and a wrapping machine which applies multiple sheets of a thin material to form a package of an effective strength that maintains the form and integrity of the hay bales, and prevents them from expanding back to their pre-compressed size. The wrapping machine applies the thin film to successive compressed hay bales such that the material extends therebetween to integrate multiple hay bales into a common bundle. A partial cutting machine positioned downstream of the wrapping machine cuts a portion of the material between adjacent hay bales to provide a detachable seam. A full cutting machine positioned downstream of the partial cutting machine completely cuts the material between selected pairs of adjacent wrapped hay bales to define sets of multiple wrapped hay bales.

14 Claims, 12 Drawing Sheets

SYSTEM AND METHOD FOR PACKAGING BALES OF HAY AND AN IMPROVED WRAPPING APPARATUS

RELATED APPLICATIONS

This patent issued from a continuation-in-part application that was based upon, and claimed priority to, U.S. patent application Ser. No. 08/052,333, filed Apr. 22, 1993 now U.S. Pat. No. 5,433,058.

TECHNICAL FIELD

This invention relates to a system and method for packaging bales of hay. This invention also relates to a wrapping apparatus.

BACKGROUND OF THE INVENTION

U.S. farmers export a large amount of hay products to foreign countries each year. The hay is harvested, baled, and then placed in large shipping containers for transfer to foreign countries. To reduce freight costs, it has become a practice within the industry to press hay into small units of higher density so that more hay can be placed within each container. For example, field-baled hay bales are compressed one-third to one-half their original size.

Conventional hay bale recompression systems include a press and a banding machine (or alternately, a twine knotter). The press has a chamber into which a normal-sized hay bale is transferred by an input hydraulic cylinder or ram. Such a hay bale is typically referred to as a "charge of hay". Once inside the chamber, a compression hydraulic ram compacts the hay bale. Thereafter, an output hydraulic cylinder forces the bale from the compression chamber into a strapping chamber at the banding machine.

Conventional banding machines employ four rectangular tracks which surround the strapping chamber. The strapping chamber has peripheral slots that enable the bands or straps to be pulled into the chamber and bound around the hay bales. The bales are indexed to place two sets of straps thereon. The straps maintain the integrity and form of the compressed hay bale.

The bound bales can then be pushed from the banding machine to a cutting unit having a knife or blade which is passed vertically through the bale to sever it into two uniform size and weight bales suitable for handling and shipping. If cut, the two sets of bands are divided such that one set of bands retains the shape of one of the resulting bales, while the second set of bands retains the shape of the other bale. If a large bale is desired, the bale remains uncut. A full bale weighs approximately 150 pounds and a severed baled forms two 75 pound bales. The bales are then placed in shipping containers for export to foreign countries.

Hay bale recompression systems of the type described above are disclosed in U.S. Pat. No. 5,001,974 to Gombos and U.S. Pat. Nos. 4,676,153, 4,718,335, and 4,763,574 to Ast.

Conventional hay bale recompression systems have a significant drawback stemming from the use of the banding machine. Employment of the banding machine introduces inefficiency into the system because the hay bales periodically stop for intervals of 3–5 seconds so that the straps can be placed on them. Because two sets of straps are placed on each bale, the entire system is forced to stop for an interval of 6–10 seconds simply due to the banding apparatus.

Another drawback is that the hay bales must be precisely indexed and positioned within the banding machine so that both sets of bands are not applied in a skewed or off-center manner relative to the bale. If the hay bale is not precisely positioned, the bands may be longitudinally displaced a sufficient amount that, after the bales have been severed at the cutting station, one or more of the bands slip off causing the hay bale to fall apart.

Another problem associated with the banding machine is that it contributes a significant portion of the overall system downtime due to breakdown or cleaning. The banding machine is a relatively delicate instrument as the tracks must be kept clean and the strap guides maintained to insure proper operation.

Another drawback associated with conventional bale recompression systems concerns the resulting bale product. Conventional systems produce a compact hay bale having a set of straps bound around it to hold the bale together. However, the straps are very narrow and often do an inadequate job of holding the hay together as a bale. During transport, portions of the hay bale may be disconnected from the bale and lost, thereby resulting in an inefficient transport of the hay.

Another drawback is that the resulting bale product must be individually carried and placed on a shipping pallet or in the shipping container for export. This is an inefficient and labor-intensive approach to filling the shipping container. U.S. Pat. No. 5,111,931 discloses a technique in which multiple hay bales are arranged in rows and columns, and then bound together as a unit by a sheet of pre-stretched polymeric film to create a "pallet"-size bundle that can be handled by a forklift truck or the like. However, the process in the '931 patent requires that each hay bale within the "pallet"-size bundle be individually banded prior to being wrapped with the film, and thus the problems associated with banding remain. Additionally, each bound bale must be carried and placed in a preset pattern with other bales before the wrap is applied.

U.S. Pat. No. 5,012,631 discloses a portable bale wrapping machine for wrapping a protective plastic film around large bale rolls to protect the bales from weather during outdoor storage. However, the plastic film is applied only to bales of hay that have already been banded with straps. The plastic film is merely for protection from the weather, and is not used to maintain the integrity of the rolled hay bale. Accordingly, the bale wrapper in the '631 patent has the drawback in that the bales of hay must first be banded prior to application of the protective plastic film.

This invention eliminates the above-identified problems of conventional systems by providing a system and method for packaging bales of hay.

BRIEF DESCRIPTION OF THE DRAWINGS

Preferred embodiments of the invention are described below with reference to the following accompanying drawings. Like components and features are designated throughout this disclosure by the same reference numerals.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
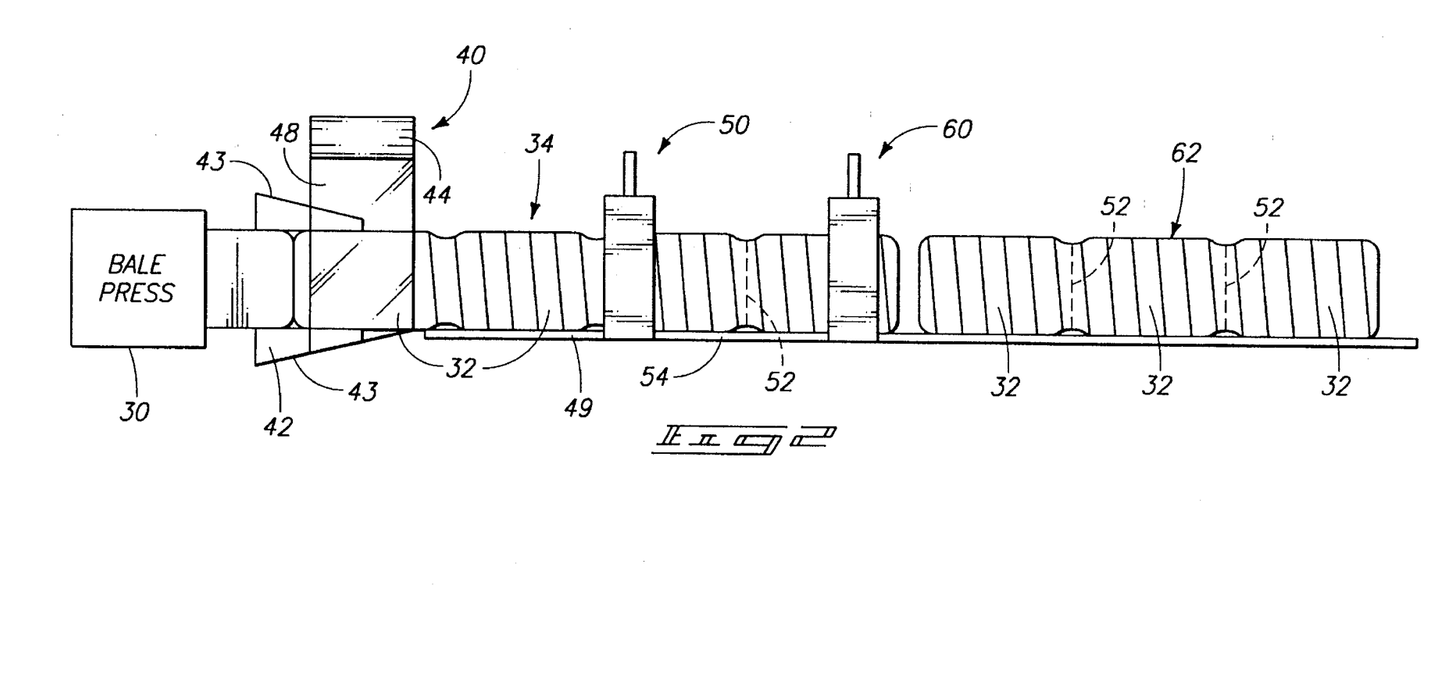
FIG. 1 is a block diagram illustrating a system for packaging bales of hay according to one embodiment of this invention.

FIG. 1 illustrates a system 20 for packaging bales of hay according to one embodiment of this invention. System 20 consists of a press 30, a wrapping machine 40, a partial cutting machine 50, and a full cutting machine 60. Press 30 is employed to compress a quantity of hay, typically in the form of a common field-baled bale of hay, within a chamber to form a smaller hay bale. The press then transfers the compressed hay bales from the chamber to wrapper 40 which continuously wraps one or more sheets of material around the compressed hay bales as they are extruded through the wrapper. The wrapping machine applies an effective amount of material at a selected wrapping rate so that the compressed hay bales are prevented from expanding back to their pre-compressed dimensions. The material is applied to successive compressed hay bales and extends across the gaps between adjacent wrapped hay bales to integrate multiple hay bales within a common bundle.

The common bundle of hay bales is indexed to a partial cutting machine 50 which cuts a portion of the material in the gaps between adjacent wrapped hay bales to provide a detachable seam and thereby define individual wrapped hay bales. The bundle of hay bales is then transferred to a full cutting machine 60 which completely cuts the material between selected pairs of adjacent hay bales to define sets of multiple wrapped hay bales wherein individual sets have detachable seams between adjacent bales.

Accordingly, system 20 produces sets of wrapped hay bales that are easy to handle with a forklift and can therefore be efficiently loaded into shipping containers. Such packaging eliminates the labor intensive and potentially time-consuming tasks of manually carrying and arranging individual bales on a pallet for loading into a container as is the present industry practice. The resultant package also eliminates the need to bundle pallet-size groups of the pre-bound hay bales as disclosed in U.S. Pat. No. 5,111,931. After the hay has been shipped and unloaded, the detachable seams allow the end user to singulate individual hay bales from the set of hay bales to promote easy handling by an individual person.

Figure 2:
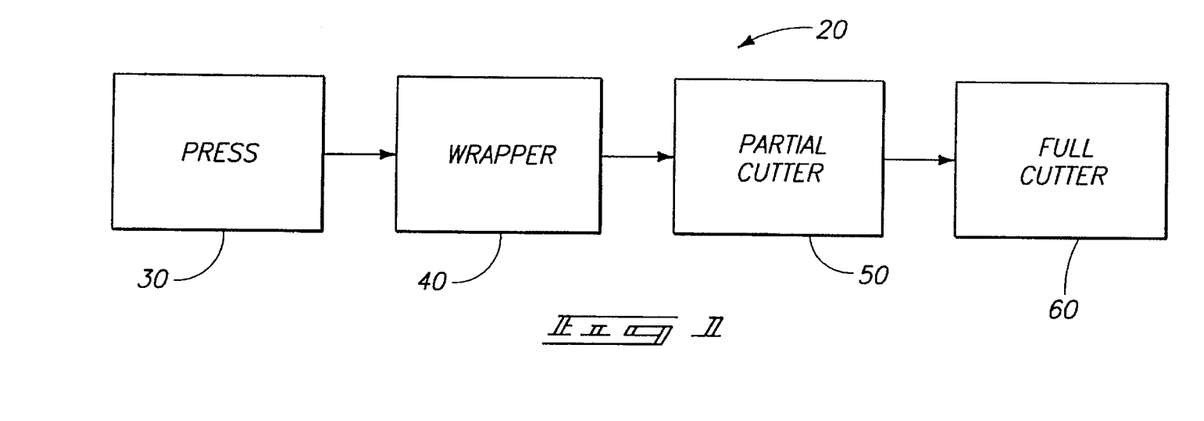
FIG. 2 is a diagrammatic illustration of the FIG. 1 system.

FIG. 2 illustrates the system for packaging hay bales in more detail. A quantity of hay is initially transferred to bale press 30. As used in this disclosure, the term "hay" means alfalfa, legumes, and other herbage or grasses. Commonly, hay is a grass that is cut and cured for fodder. The hay typically comes to bale press 30 in the form of a normal-sized field-baled bale of hay which weighs about 75 to 150 pounds and has dimensions of 48"×22"×16". This bale size is suitable for local manual handling and storage, but is too bulky for efficient and cost-effective commercial shipping to foreign markets.

The field-baled hay bales are loaded into a compression chamber within bale press 30. Such loading may be accomplished by a conveyor system, manually, or by some other feed mechanism. Bale press 30 includes rams mounted on hydraulic cylinders which compress the hay bales down to a smaller second size that is one-third to one-half the size of the original bale. For example, a common size for a compressed hay bale is 22" in length, 14–16" in height, and 22" in width. According to some presses, the hay is over-pressed within the chamber to a length of 10–12 inches, but is later permitted to expand to a resulting length of 16–22 inches.

Bale press 30 includes another hydraulic ram which transfers the compressed hay bales from the compression chamber. Alternatively, a conveyor system can be used to transport the bales. The hydraulic ram and conveyor system represent two embodiments of a press means for transferring the hay bales from the chamber. Bale press 30 is of conventional design and is not described in detail in this disclosure. The bale presses disclosed in U.S. Pat. Nos. 5,001,974 and 4,676,153 are suitable for use within the system constructed according to this invention.

The press transfer means moves the compressed hay bales from the compression station downstream to the wrapping station. More specifically, the hay bales are turned 90° sideways as they are pushed to the wrapping station. At the wrapping station, a wrapping machine 40 is positioned and aligned to receive the compressed hay bales from bale press 30. Wrapping machine 40 has a conduit 42 through which the compressed hay bales 32 are extruded under force from the press transfer means. The conduit is dimensioned to retain the size of the compressed hay bales 32. Conduit 42 preferably defines a rectangular-shaped passageway having a height of 14–16 inches and a width of 14–16 inches. Wrapping machine 40 further includes a rotatable wheel (not shown in this Figure) which carries at least one spool of material 44 around the compressed hay bales 32 as they are extruded through and out of conduit 42. In the preferred embodiments, the rotating wheel of wrapping machine 40 supports multiple spools of material to dispense multiple layers of material during each revolution of the wheel. The material is preferably plastic, such a stretch-wrap or shrink-wrap plastic, and more preferably, ultra-high molecular weight plastic. Two preferred embodiments of the wrapping machine are discussed below in more detail with reference to FIGS. 3–6 and 13.

Compressed hay bales 32 are extruded through and out of conduit 42 at a selected extruding rate that is preferably 18–22 inches per 3–5 seconds. Simultaneously, the wrapping machine applies an effective amount of material at a selected wrapping rate that prevents the compressed hay bales from expanding back to their pre-compressed size. The preferred amount of material is sufficient to provide a wrapping strength in the range of approximately 480–2400 pounds of tensile strength per 22" bale, depending upon the type of hay being wrapped. For alfalfa, a lower strength (such as 480–500 pounds) is effective to maintain the integrity and dimensions of the compressed bale. For some grasses, the wrap should have a higher strength of approximately 2400 pounds in order to retain the form of the compressed hay bale.

The amount of material applied to the hay bale 32 is dependent upon several variables, including (1) the rate at which the wheel is rotated about the compressed hay bales, (2) the number of spools 44 mounted to the wheel, and (3) the strength of the individual sheets of wrapping material.

As an example group of parameters, assume that system 20 is packaging bales of alfalfa. Six spools of thin strength-wrap material are mounted to the rotating wheel, as represented by spool 44 in FIG. 2. Individual sheets of material 48 provide a layer having a strength of approximately 30–50 pounds of tensile strength. For purposes of this example, a sheet of material has a tensile strength of 40 pounds. Preferably, the sheet of material 48 has a width of approximately 11 inches, and a thickness of approximately 85 gauge. The rotational velocity of wrapping machine 40 is set so that the wheel makes one or more rotations for each extruded hay bale 32. That is, the rotational velocity is synchronized and coordinated with the extruding rate of 18–22 inches per 3–5 seconds, such that one or more rotations of the wheel is made every 3–5 seconds.

In this manner, six layers of thin plastic material 48 are simultaneously wrapped around compressed hay bales 32 with the number of rotations being adjusted to achieve the desired package strength. For alfalfa, the wheel would make approximately two rotations. This effectively produces a package having an overall strength of 480 pounds (i.e., 6 layers×40 pounds/layer with two rotations of 11" wrap per 22" bale), which is an effective amount to prevent the alfalfa bales from expanding back to their pre-compressed size. Many more rotations per bale would be required for other grasses in which an overall strength of 2400 pounds is desired.

The wheel is arranged in relation to conduit 42 such that material 48 is applied partially on conduit 42 and partially on compressed hay bales 32 as they exit from the conduit. More specifically, approximately 6 inches of material 48 overlaps conduit 42 and approximately 5 inches of material overlaps bales 32.

Conduit 42 has tapered exterior walls 43 which help guide sheet 48 onto compressed bales 32. The plastic material preferably sticks to itself, but not to the conduit nor to the hay bales. Accordingly, the right portion of the plastic sheet continuously contacts and meshes with an underlying layer of plastic while the hay bales are being extruded out of conduit 42. Meanwhile, the left portion of the plastic sheet continuously slides off the tapered walls of conduit 42 as it is pulled along by the meshing action occurring at the right portion of plastic.

Figure 12:
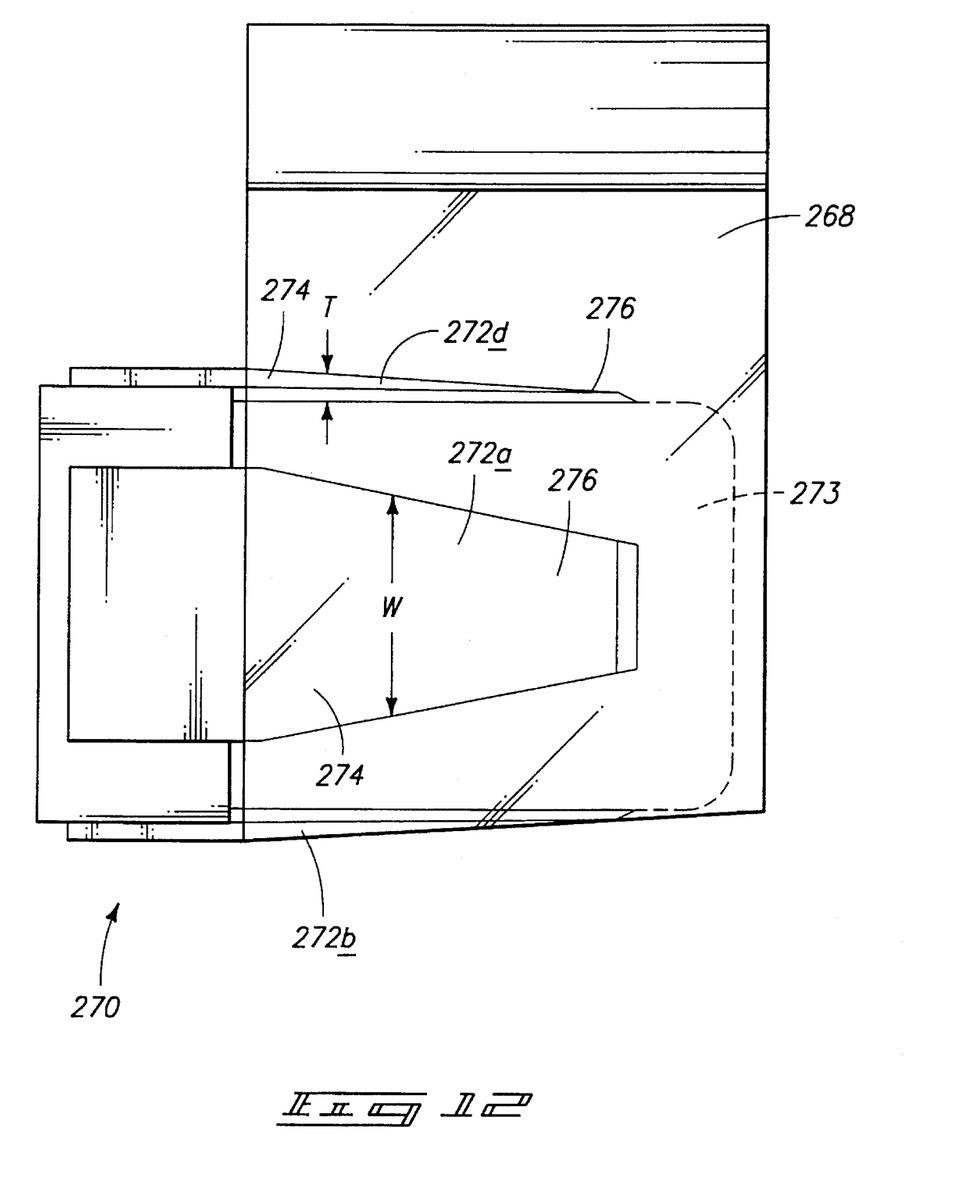
FIG. 12 is a diagrammatic side view of an extruding conduit according to one aspect of this invention.
Figure 13:
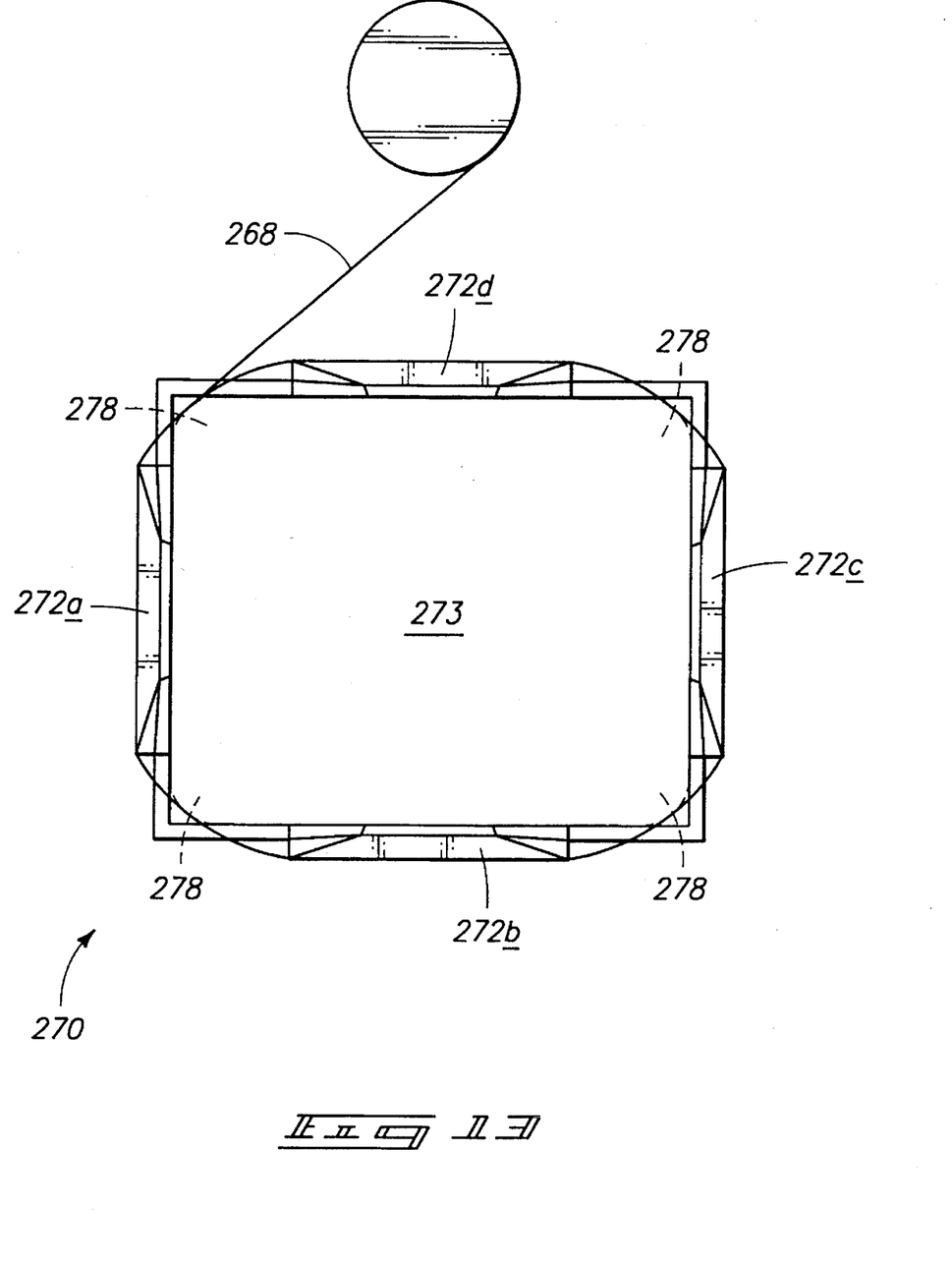
FIG. 13 is a diagrammatic front elevational view of the FIG. 12 extruding conduit.

FIGS. 12 and 13 show a conduit 270 according to another aspect of this invention. Conduit 270 comprises four prongs 272a–272d (with prong 272c hidden in FIG. 12) provided on four sides of the hay bale 273. The prongs are essentially identical in size and shape. Each prong has a first end 274 and a second end 276 (FIG. 12). The prong tapers in width W from the wider first end 274 to the narrower second end 276. This design facilitates application of material 268 to hay bale 273. The four prongs maintain the compressed hay bale in its compact state while exposing four longitudinally running edges 278 (shown in cross-section in FIG. 13) to which material 268 can more easily attach.

Each prong also tapers in thickness T from the thicker first end 274 to the thinner second end 276. This taper of the exterior walls is similar to the design of conduit 42, discussed above, in that it promotes easy discharge of the material as the hay bale is extruded out of the conduit.

Conduit 270 improves the wrapping process by facilitating more precise application of the wrapping material. After many layers of material (e.g. 20 layers) have been applied to the bale, the bale is extruded out of conduit 270. The layers of material slide off the prongs along with the bale by virtue of (1) the increased area of contact between the material and bale resulting from the tapered width and (2) the sloping exterior surface resulting from the tapered thickness. In this manner, the layered wrap is applied and maintained in the desired location relative to the hay bale.

Conduit 270 is dimensioned to extend along the feed axis at least 75% of the length (taken along the feed axis) of the hay bale 273, with 80% of the hay bale length being most preferred. This increased conduit length provides better control and handling of the hay bales as they are extruded therethrough.

One possible modification of conduit 270 is to employ retractable prongs as opposed to stationary ones. The retractable prongs preferably move inward and outward relative to the hay bale under hydraulic force or the like. As the hay bale is extruded through the conduit, the prongs are retracted outward to release the present hay bale and then moved back inward to hold the next hay bale. The prongs could also be designed to retract longitudinally relative to the hay bale, thereby sliding out from underneath the wrap.

Returning to FIG. 2, wrapping machine 40 continuously applies one or more of layers of material as hay bales 32 are moved through wrapping station 40. According to one aspect of this invention, wrapping machine 40 is equipped with a velocity controller which controllably adjusts the rotational velocity of the rotating wheel. The controller can set the wheel velocity at a constant value or vary it during operation. One advantage to the variable speed controller is that the wrapping operation can be synchronized with the pressing operation. Bale press 30 requires a finite period of time to compress the hay bale to the desired size. Such a period is a commonly 6–10 seconds. Because the flow of compressed hay bales 32 through the system is dependent upon the rate that the bales are moved from the bale press, the flow of hay bales downstream of the press is interrupted periodically during the pressing interval. The ability to adjust the speed of the wrapping machine on the fly is useful so that the wrapping machine can be intermittently slowed or stopped during the pressing interval so as not to waste an inordinate amount of material on the same section of hay bales while the hay bale stream is temporarily stopped. Ideally, the speed is synchronized with the hay bale extrusions so that a substantially constant amount of material is provided on the hay bales.

On the other hand, it may be desirable to continue placing material on the hay bales during the pressing interval rather than slowing down the wrapping machine. In this mode, the wrapping machine continuously applies layers of material while the hay bale stream is stationary to apply a selected number of layers to the hay bales. If the user wishes to add even more layers of wrap, the wrapping machine velocity can be increased so as to apply more material during the pressing interval. Alternatively, the wrapping machine velocity can be kept constant and the stream of compressed hay bales can be controlled to remain stationary for an extended time period greater than the pressing interval to allow application of more material.

The constant velocity setting is useful when the system is not dependent upon the flow of hay bales directly from a single bale press. For example, hay bales may be alternately supplied by multiple bale presses such that no delay is experienced in downstream operations. As another example, aspects of this invention may be employed without a bale press wherein an independent supply of compressed bales is fed to the wrapping station. In these situations, the wrapping machine can work at a constant rate.

FIGS. 3–6 illustrate the wrapping machine 40 according to a first preferred embodiment of this invention. Wrapping machine 40 includes a frame 70 and a wheel 72 rotatably mounted to frame 70. Conduit 42 is fixedly mounted to frame 70 at a central location relative to wheel 72. In this manner, wheel 72 rotates about a feed axis along which a stream of hay bales are passed through conduit 42. Wrapping machine 40 includes a motor or other drive means 74 mounted to frame 70, and a drive coupling 76 for interconnecting drive shaft 78 with rotatable wheel 72. Drive coupling 76 is illustrated as a chain and sprocket mechanism, but can be provided in other forms, such as a belt and roller assembly or a gear assembly. A chain tensioner 79 is employed to remove the slack from the coupling chain.

Wrapping machine 40 includes multiple guide and support wheels 80 which are rotatably mounted to frame 70 to support wheel 72. Rollers 80 sit on a track 82 (FIGS. 5 and 6) and provide relatively friction-free support for wheel 72.

Figure 4:
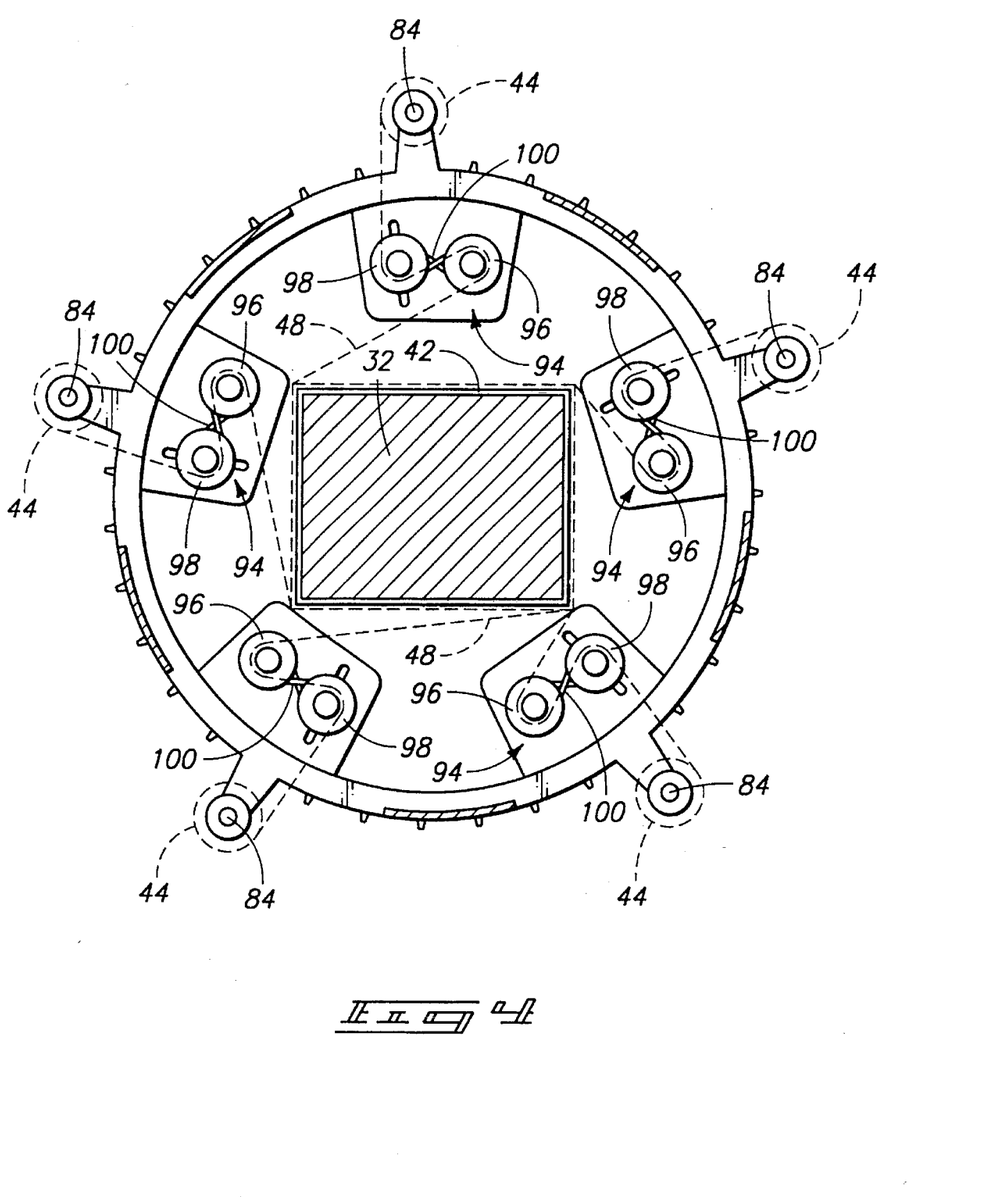
FIG. 4 is a diagrammatic rear elevational view of the FIG. 3 wrapping apparatus.
Figure 5:
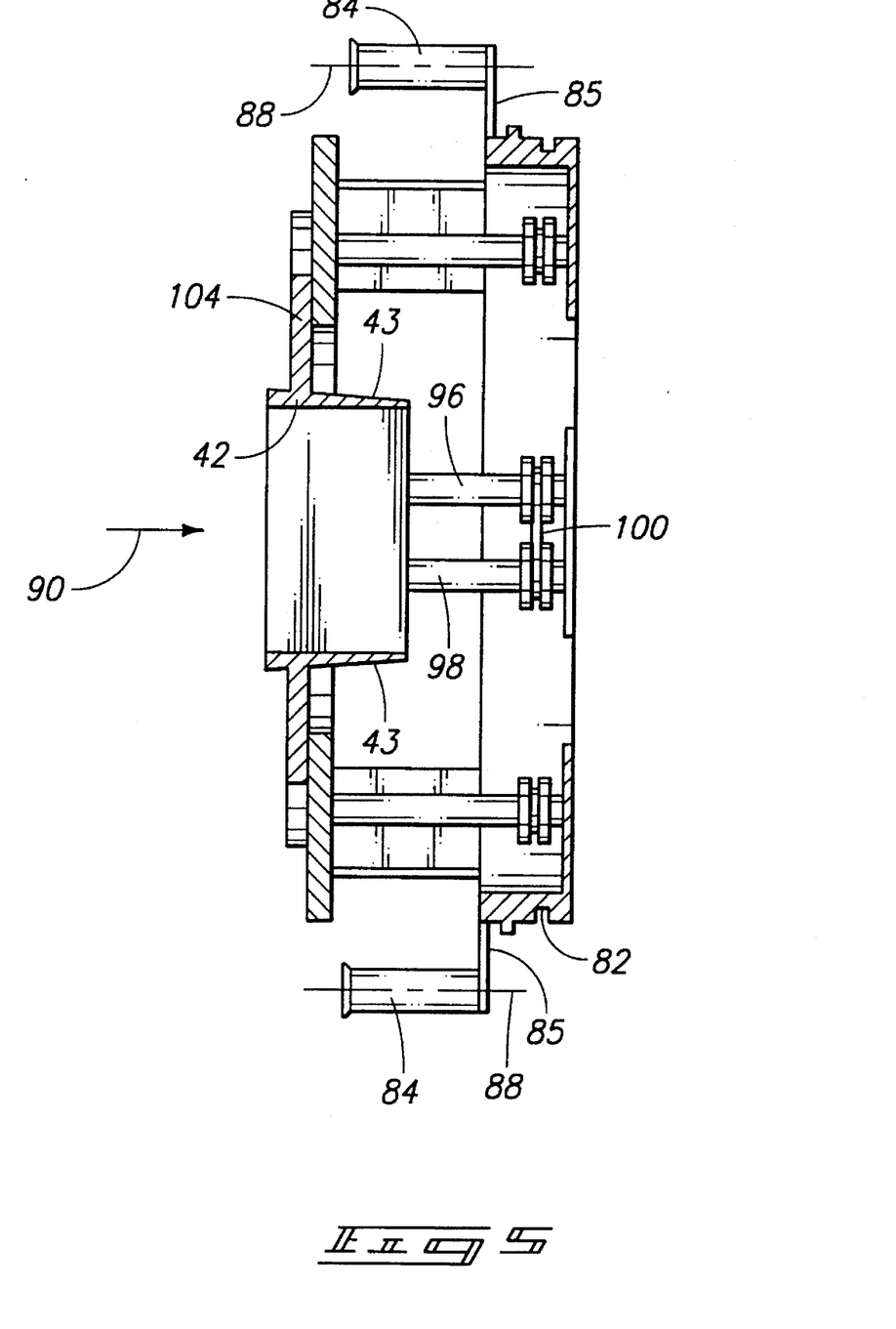
FIG. 5 is a diagrammatic cross-sectional view taken through lines 5—5 of FIG. 3.

In this embodiment, wrapping machine 40 has five spool shafts 84 mounted to radial spokes 85 of wheel 72. Spool shafts 84 are evenly spaced about the circumference of the wheel to support individual spools of plastic wrap 44 (FIG. 4). Preferably, spool shafts 84 are aligned along axes 88 which are substantially parallel to feed axis 90 (FIG. 5). More or less than five spool shafts can be mounted to wheel 72, with 5–10 such shafts being most preferred. Multiple spool shafts are advantageous because such a construction can efficiently apply multiple layers of material while operating for longer periods of time before replacement spools of material are needed.

Figure 6:
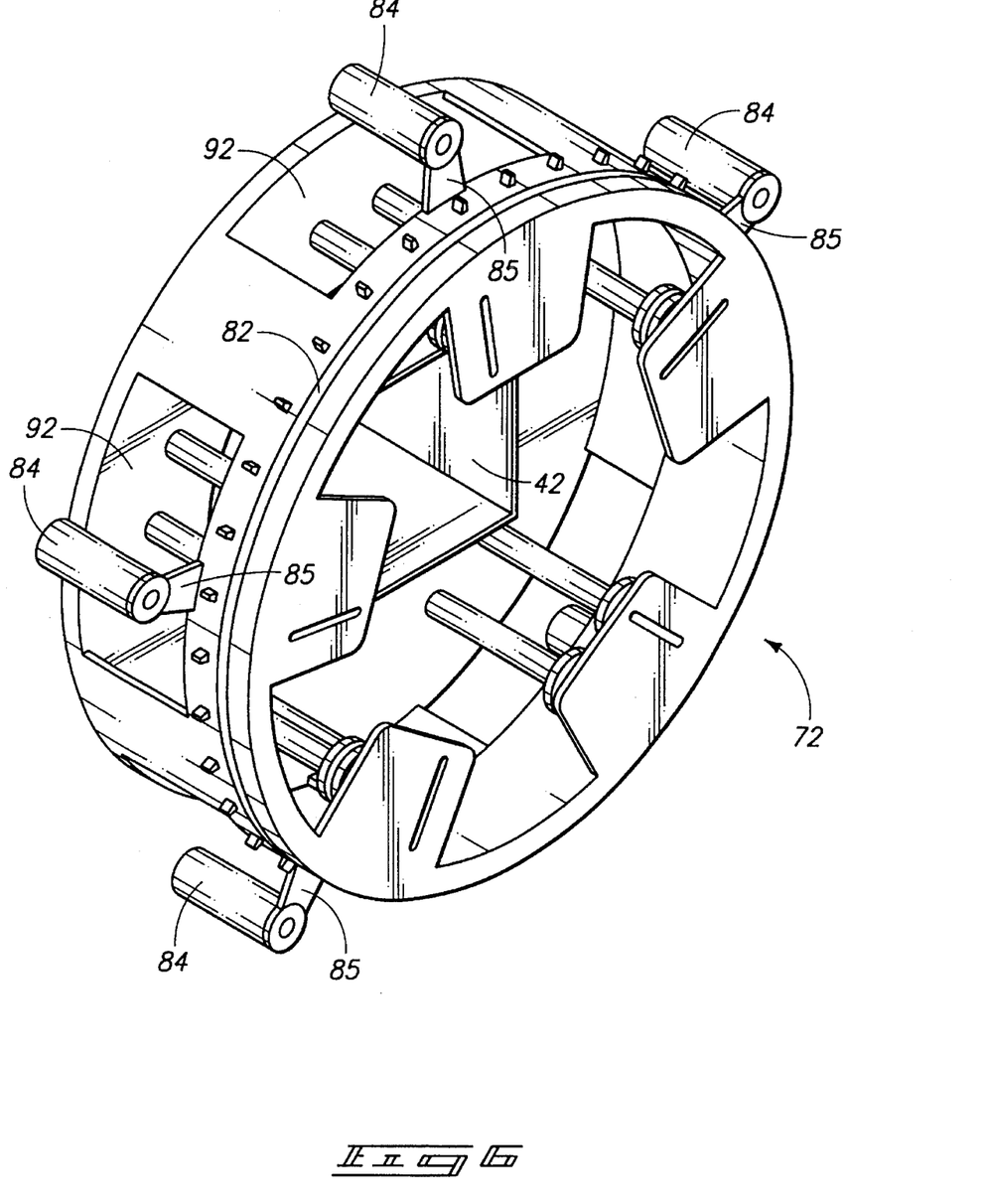
FIG. 6 is a diagrammatic perspective view of the FIG. 3 wrapping apparatus.

Wheel 72 is preferably a cylindrical-shaped drum having multiple windows 92 formed therein beneath corresponding spool shafts 84 (FIG. 6). Spool shafts 84 are mounted to the radial spokes outside of the drum. The sheets of material 48 dispensed from the spools of material 44 enter the drum through corresponding windows 92 (FIG. 4).

Wrapping machine 40 also includes multiple pairs of discharging rollers 94 which are rotatably mounted to wheel 72 for guiding individual plastic sheets 48 from spools 44 toward conduit 42. Individual roller pairs 94 include a first or drive roller 96 and a second or driven roller 98. Rollers 96 and 98 are coupled by a drive belt 100 (or alternatively, by a gear arrangement). Drive rollers 96 have corresponding planetary gears 102 (FIG. 3) operatively mounted thereto which mate with and revolve around a large, central, stationary gear 104 as wheel 72 rotates. This in turn causes drive wheel 96 to rotate, which then transfers power via coupling belt 100 to turn driven roller 98.

Figure 3:
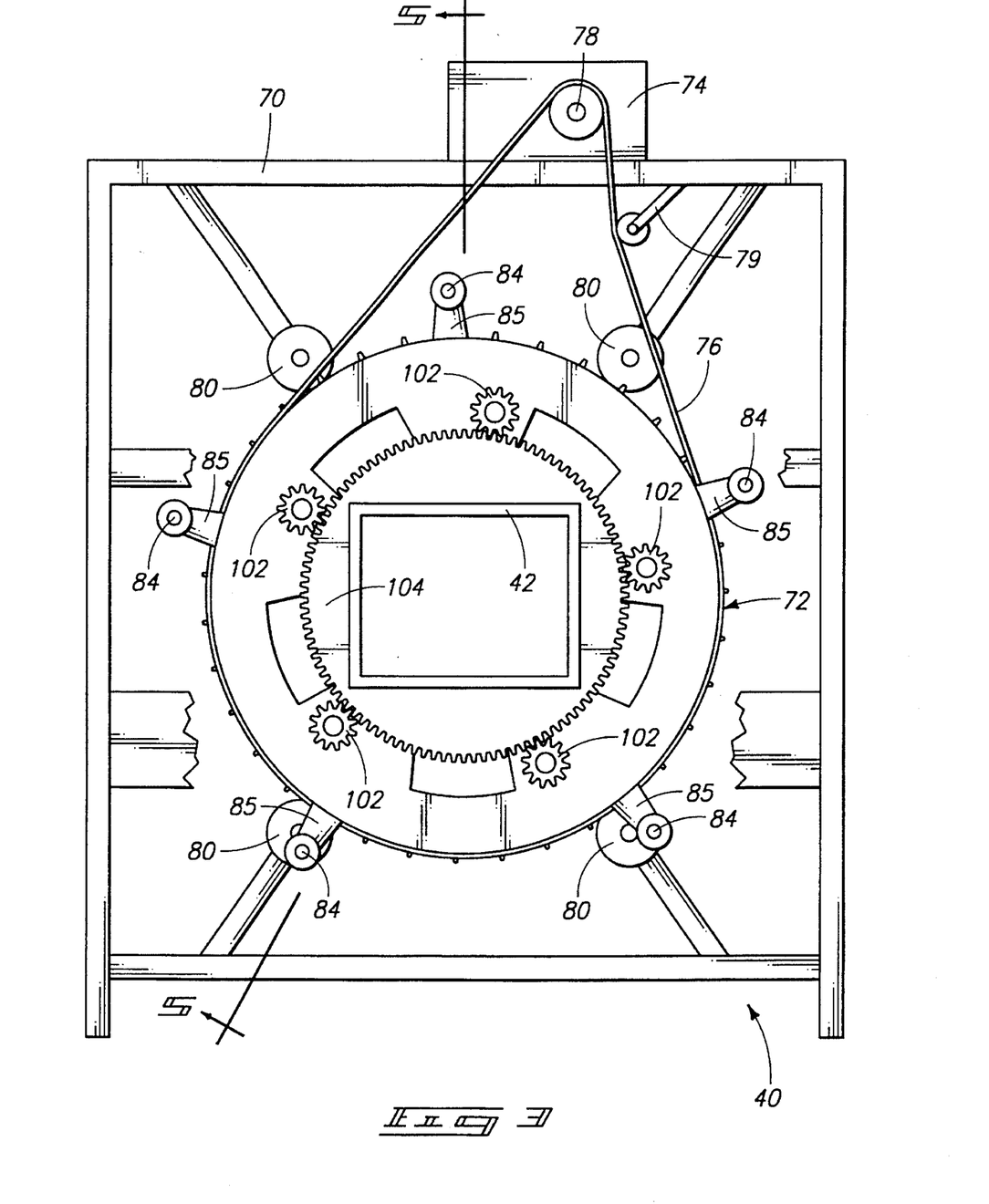
FIG. 3 is a diagrammatic front elevational view of a wrapping apparatus constructed according to one embodiment this invention.

Stationary gear 104 is fixedly mounted to frame 70 and can be integrally formed with conduit 42. Stationary gear 104 is mounted transverse to the feed axis 90, and more preferably, perpendicularly to the feed axis.

Discharging roller pairs 94 therefor spin at a rate according to gear ratios of corresponding planetary gears 102 to stationary gear 104. The smaller the planetary gear 102, the faster the discharging rollers will spin. Conversely, large planetary gears 102 induce a relatively slower spin of discharging rollers 94. Gear size is selectable to create the desired stretching of the plastic material as it is being wound around compressed bales of hay. As shown in FIG. 4, individual sheets 48 are guided from spool 44 through discharging roller pairs 94 onto hay bale 32. A large gear size causes proportionately more stretching to occur because the discharging rollers spin at a lower velocity. Alternatively, a smaller gear size causes less stretching because the rollers rotate at a high velocity. Preferably, the sizes of planetary gears 102 are selected to induce a stretch of approximately 25%. In other situations, it may be preferred to create a more significant stretch using material with inherent memory that will shrink back toward its pre-stretched form after it has been wound onto the compressed hay bales.

Figure 14:
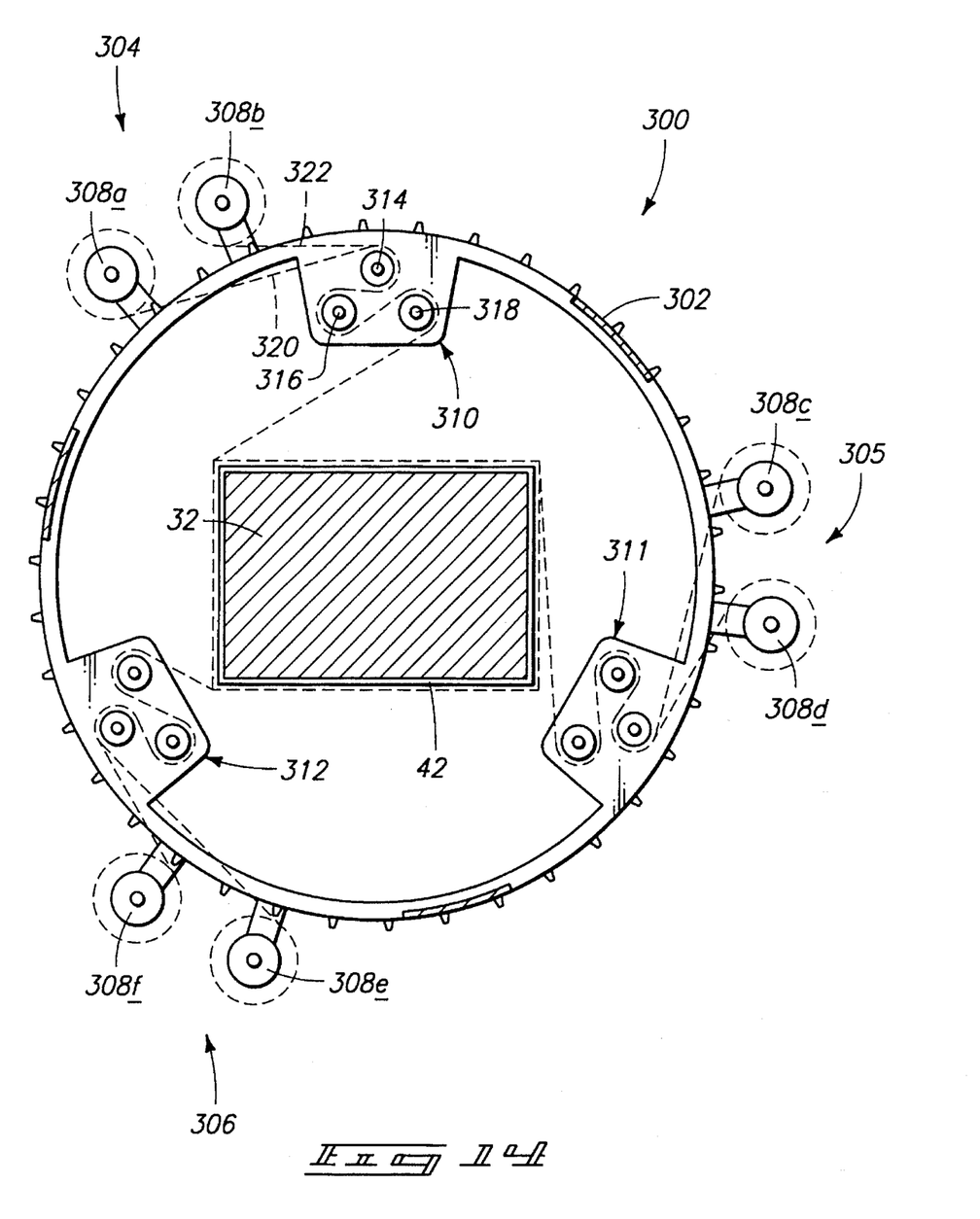
FIG. 14 is a diagrammatic rear elevational view of a wrapping apparatus according to another embodiment of this invention.

FIG. 14 illustrates a wrapping machine 300 according to a second preferred embodiment of this invention. Wrapping machine 300 has a wheel 302 that differs from wheel 72 (FIGS. 3–6) primarily in the construction of the spool shafts and discharging rollers. More particularly, wrapping machine 300 has three pairs of spool shafts 304–306 which support six spools of material 308a–308f. Three discharging roller sets 310–312 are provided for respective spool shaft pairs 304–306. The roller sets 310–312 are radially inward, but circumferentially displaced from the corresponding shaft pairs 304–306. As shown, the roller sets are forward of the shaft pairs relative to the clockwise rotation of wheel 302. Alternatively, the roller sets could be positioned to lag the shaft pairs relative to the direction of rotation. It should be noted that more than two shafts can be used with each set of discharging rollers.

When plastic is used as the wrapping material, it has been discovered that the paired roller shaft configuration of wheel 302 applies the plastic more effectively. Single sheets of lower gauge plastic have weak spots which can tear or break. However, by running two (or more) layers of plastic simultaneously over the same set of discharging rollers, the two sheets of plastic combine to form a stronger two-ply sheet. This wrapping technique minimizes tearing and breakage. The wheel design of FIG. 13 therefore facilitates application of multiple layers of wrapping material in a manner that is less likely to cause tearing or ripping of the material.

Individual roller sets 310–312 have three rollers to prestretch the tandem sheets of material discharged from associated spools 308 prior to wrapping the sheets around the hay bale 32 held in conduit 42. The three roller sets operate in the same manner and thus explanation is made only with respect to roller set 310. Set 310 has a first roller 314, a second roller 316, and a third roller 318. Two sheets of material 320 and 322 are discharged from spools 308a and 308b, respectively, and then initially passed by first roller 314, woven around second roller 316, and finally passed by third roller 318. Second roller 316 is mechanically coupled to an associated planetary gear 102 (FIG. 3) so that roller 316 rotates as wheel 302 is rotated. The first and third rollers 314, 318 are rotated by second roller 316 via two separate coupling belts or gear arrangements (not shown).

The three rollers are mechanically coupled to spin at different rates to prestretch the material. Preferably, third roller 318 is calibrated to feed out material at approximately the same rate as it takes to make one revolution about conduit 42. Second roller 316 has a rotational rate that is approximately 35%–55% (with a range of 40%–50% being most preferred) slower than the rotational rate of third roller 318. Due to this speed differential, most of the material stretching occurs between the second and third rollers 316, 318, rather than between the last roller and the conduit. In contrast, in the two roller embodiment of FIGS. 3–6, the primary stretch is made between the last roller and the conduit.

First roller 314 has a rotational rate that is approximately 5%–15% (with 10% being most preferred) slower than the rotational rate of second roller 316. This keeps the material tight as it goes around the second roller to minimize slippage.

While the preferred embodiments employ a rotating wheel to apply the plastic wrap, another less preferred embodiment of a system for packaging hay bales according to an aspect of this invention is to rotate conduit 42 within a stationary frame having spools of material mounted thereto. Other means for wrapping material around the compressed hay bales may also be employed.

Returning again to FIG. 2, wrapped hay bales 32 are transferred from the wrapping station to the partial cutting station along a support platform 49 which comprises a conveyor, rollers, or a relatively flat sliding surface. A partial cutting machine 50 is positioned downstream of the wrapping machine at the partial cutting station. Partial cutting machine 50 cuts a portion of the material 48 between adjacent wrapped hay bales to provide a detachable seam 52 between individual compressed hay bales 32.

Figure 7:
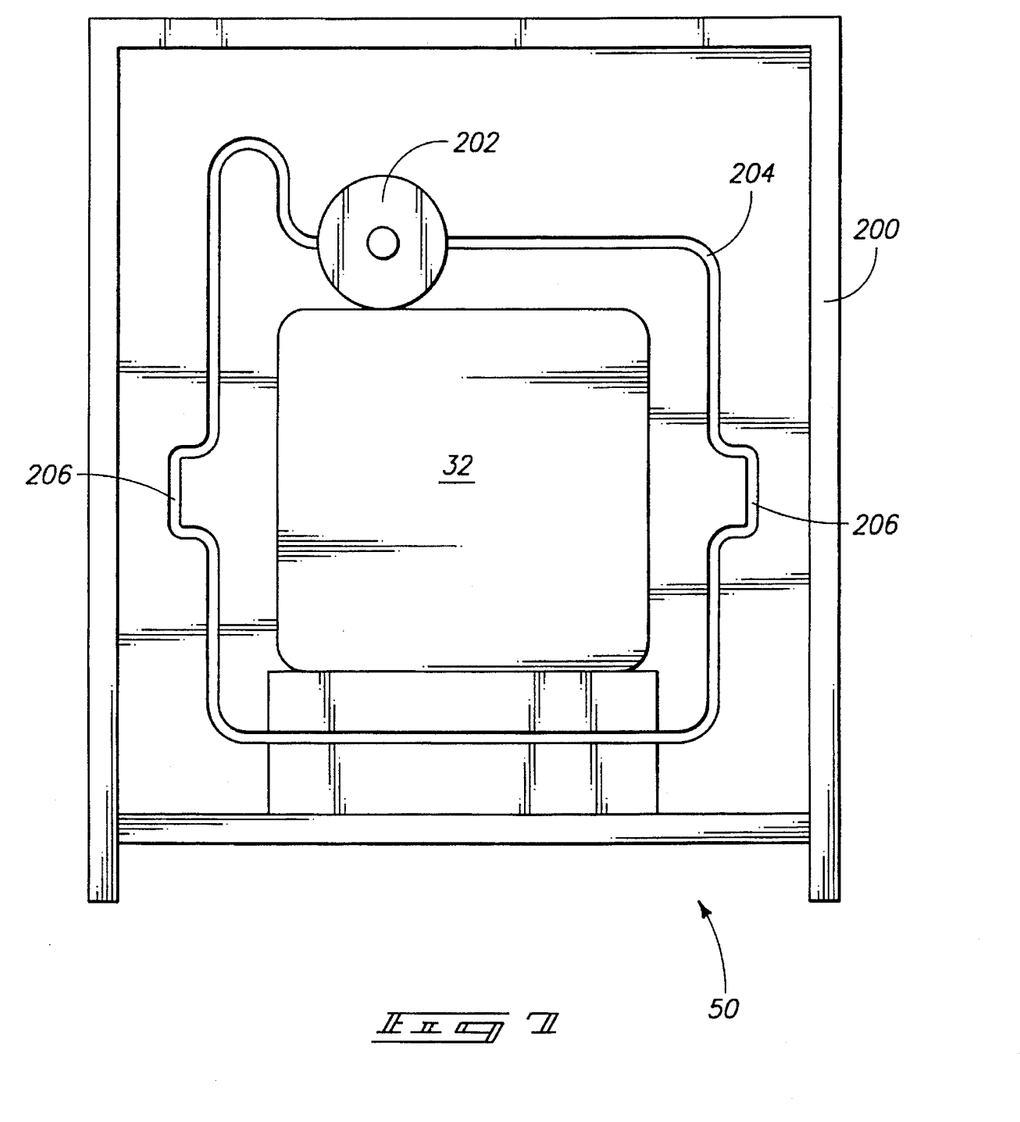
FIG. 7 is a diagrammatic front elevational view of the partial cutting apparatus according to this invention.

FIG. 7 is a diagrammatic representative of a partial cutting machine according to this invention. Partial cutting machine 50 comprises a frame 200 which supports a cutting apparatus therein. The machine includes a blade or cutting disk 202 which is operably movable about a guide path 204. Cutting disk 202 may be formed as a sharpened circular blade which physically severs the wrapping material or alternatively, the disk 202 can be heated to a sufficient temperature whereby the disk effectively melts the plastic wrap and thereby severs it.

Guide path 204 is positioned sufficiently close to hay bales 32 that cutting disk 202 is in contact with the plastic wrap material. Guide path 204 also includes turn-out portions 206 which allow the cutting disk 202 to be removed from the plastic wrap to thereby leave a portion of the plastic wrap intact. The path 204 can be designed to include more than two turn-out portions or with a larger turn-out portion depending upon the desired strength of the resulting detachable seam. Cutting disk 202 is maneuvered about guide path 204 by a drive mechanism which is not shown.

Partial cutting machine 50 is preferably synchronized to partially sever the material between adjacent wrapped hay bales during the pressing interval in which upstream hay bales are being compressed within bale press 30. Because compression typically takes 6–10 seconds, cutting disk 202 makes one revolution about path 204 in less than 6 seconds. More preferably, one revolutionary trip takes approximately 2–3 seconds.

While the embodiment of FIG. 7 is preferred, other partial cutting mechanisms may be employed in this invention. For example, a mechanism designed to uniformly perforate the material may be employed to create a detachable seam.

Returning to FIG. 2, the wrapped hay bales are transferred downstream from the partial cutting station to the full cutting station along support platform 54. A full cutting machine 60 is positioned at the full cutting station to completely sever the material between selected pairs of adjacent wrapped hay bales. In this manner, system 20 effectively produces a set 62 of multiple wrapped hay bales 32 wherein a detachable seam 52 is provided between individual adjacent hay bales. The number of hay bales per set 62 is selected by the user according to the size of the shipping container. A packaged set of 4–8 compressed hay bales is a manageable bundle that can be easily handled by a forklift or the like when loading the bales into a container.

Cutting machine 60 could be configured in many different embodiments. For example, cutter 60 could be substantially similar to partial cutting machine 50 shown in FIG. 7 with the guide track tool 204 modified to eliminate the turn-out portions 206. Alternatively, cutter 60 could comprise a single knife blade or heating element which travels entirely through the gap between adjacent wrapped hay bales to sever the material. Such cutters are within the purview of those of ordinary skill in the art, and will not be described in detail.

Figure 8:
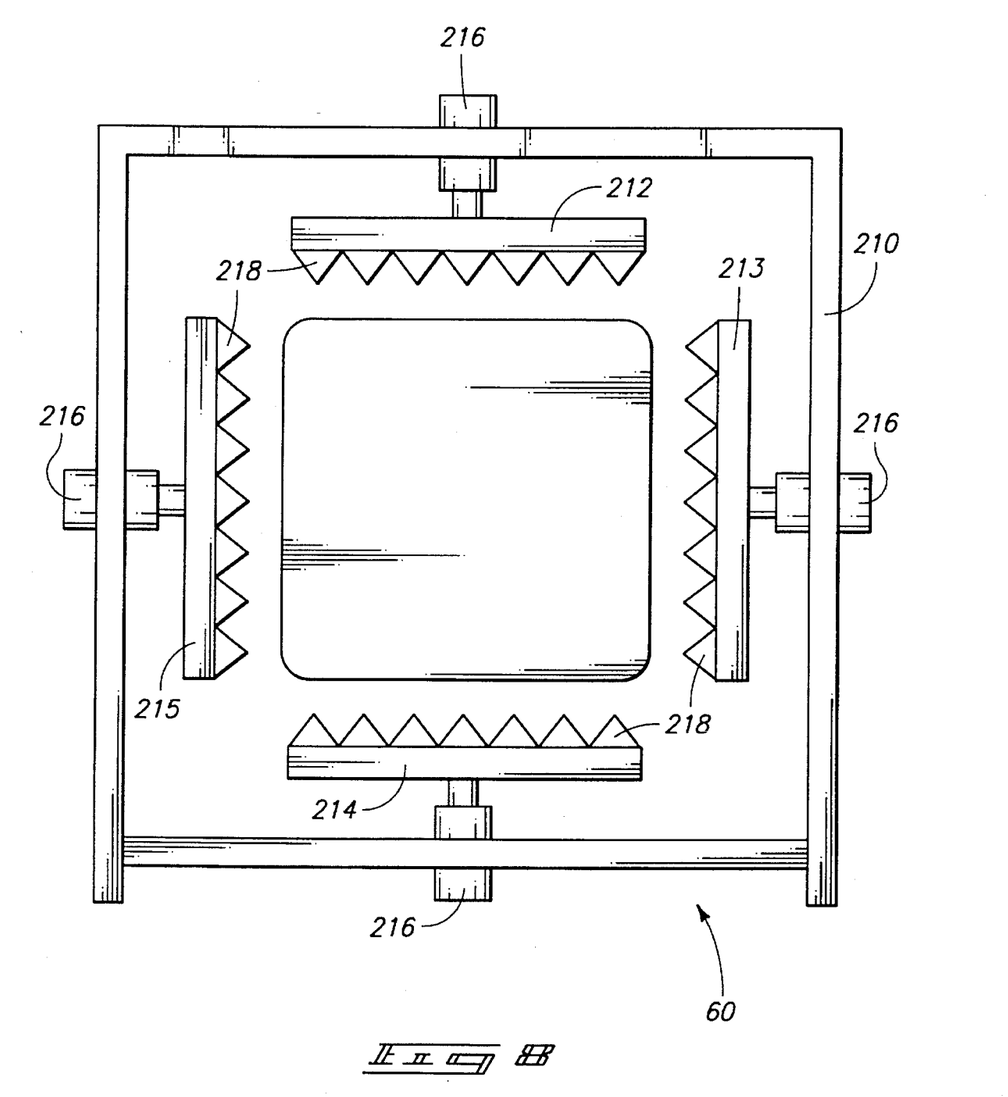
FIG. 8 is a diagrammatic front elevational view of a full cutter apparatus according to this invention.

FIG. 8 illustrates another possible configuration of a full cutting machine 60. It comprises a frame 210 which supports one or more movable cutting blades. Preferably, one cutting blade is provided on each of the four sides of the hay bale as depicted by blades 212–215. The blades are mounted to hydraulic cylinders 216 to be controllably moved between retracted positions (as shown) and extended positions where the blades physically cut the material. Individual cutting blades 212–215 include jagged teeth 218 which puncture and sever the material when the blades are moved to their extended positions. The use of four blades is preferred because very little movement of each blade between the extended and retracted positions is used to effectuate a clean cut, thereby permitting the use of smaller hydraulic components as well as promoting efficiency in the entire packaging process. However, a less preferred arrangement is to use two opposing blades (e.g., blades 213 and 215) and pass them through the gap between hay bales until they meet to effectively sever the material.

It should also be noted that the cutting machine of FIG. 8 can be controlled to operate as a partial cutting machine for use in system 20. To accomplish a partial cut, only two opposing cutting blades (such as blades 213 and 215) are actuated to create cuts only along two opposing sides of the hay bales (instead of all four sides). Alternatively, all four blades can be moved a short distance that is less than a full stroke so that only the tips of the teeth 218 pierce the material, creating a perforated seam.

According to another aspect of this invention, system 20 produces a packaged set of hay bales 62 (FIG. 2). This packaged set 62 consists of a set of multiple hay bales 32 (preferably, 4–8 hay bales) with each individual hay bale having selected dimensions. At least one layer, and more preferably, multiple layers of material are wrapped around the hay bales wherein the layers of material yield an effective strength that maintains the dimensions of the hay bales. The material extends between adjacent hay bales 32 within set 62. A detachable seam 52 is provided between adjacent hay bales 32 so that individual hay bales can be singulated from set 62.

According to yet another aspect of this invention, a method for packaging bales of hay is described with reference to FIGS. 1 and 2. A quantity of hay, such as a field-baled hay bale, is loaded into a chamber at press 30. Press 30 then compresses the quantity of hay from a first size to a smaller second size to form individual compressed hay bales. The compressed hay bales are transferred from press 30 to the wrapping station, and more particularly, to conduit 42 of wrapping machine 40. Conduit 42 prevents the compressed hay bales from expanding back to their pre-compressed size. The hay bales 32 are extruded from conduit 42 at a rate of approximately 18–22 inches per 3–5 seconds. As hay bales 32 are extruded from conduit 42, wheel 72 of wrapping machine 40 is rotated about the conduit and compressed hay bales to dispense multiple sheets of thin plastic material partially on the conduit and partially on the hay bales. As the wheel revolves, multiple sheets of plastic are wrapped around successive compressed hay bales to form a multi-layer packaging having an effective tensile strength (e.g. 480–2400 lbs.) which prevents the compressed hay bales from expanding back to their first pre-compressed size. The plastic is preferably stretched as it is wrapped around the hay bales.

The rotating wheel continuously applies the layers of plastic so that the packaging extends between adjacent compressed hay bales to integrate multiple hay bales into a common bundle 34. The velocity of the wheel can be intermittently slowed or stopped during the period in which upstream hay bales are being compressed within the press chamber. However, it is more preferred to continue wrapping the hay bales while they are motionless during the compressing period.

Bundle 34 of wrapped hay bales are next transferred to partial cutting machine 50. The packaging between adjacent wrapped hay bales is then partially cut to provide a detachable seam so that individual wrapped hay bales can be easily singulated from other wrapped hay bales. The bundle of wrapped hay bales is then transferred to full cutting machine 60. The full cutting machine completely severs the packaging between selected pairs of adjacent wrapped hay bales to define sets 62 of multiple wrapped hay bales 32 with the detachable seam 52 being provided between the hay bales within the individual sets.

The system according to this invention is advantageous over prior art systems in that it eliminates the use of straps to hold individual hay bales together. The multi-layer wrap applied by the rotating wheel replaces the straps. Thus, the banding machine is not used in this system. Accordingly, the problems associated with the banding machine and straps are obviated.

The incorporation of a partial cutting machine offers another significant advantage. The system produces sets of multiple wrapped hay bales which are too heavy for human lifting, but are easily managed with a forklift. Due to the partial cutting machine, each set has detachable seams between the wrapped hay bales. Accordingly, individual bales can be singulated from this set by tearing the bale at the detachable seam. Each of these individual bales can be conveniently handled by a human.

Figure 9:
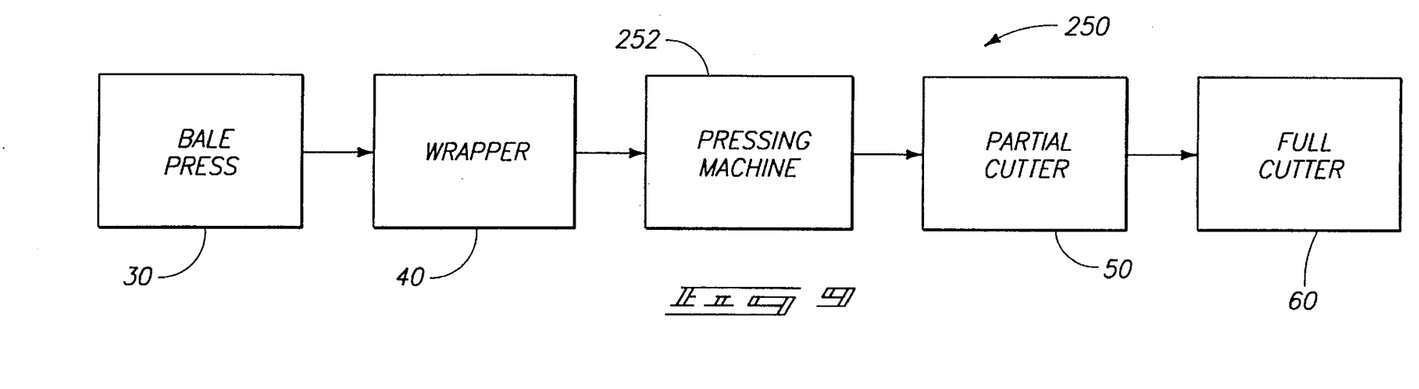
FIG. 9 is a block diagram illustrating a system for packaging bales of hay according to another embodiment of this invention.
Figure 10:
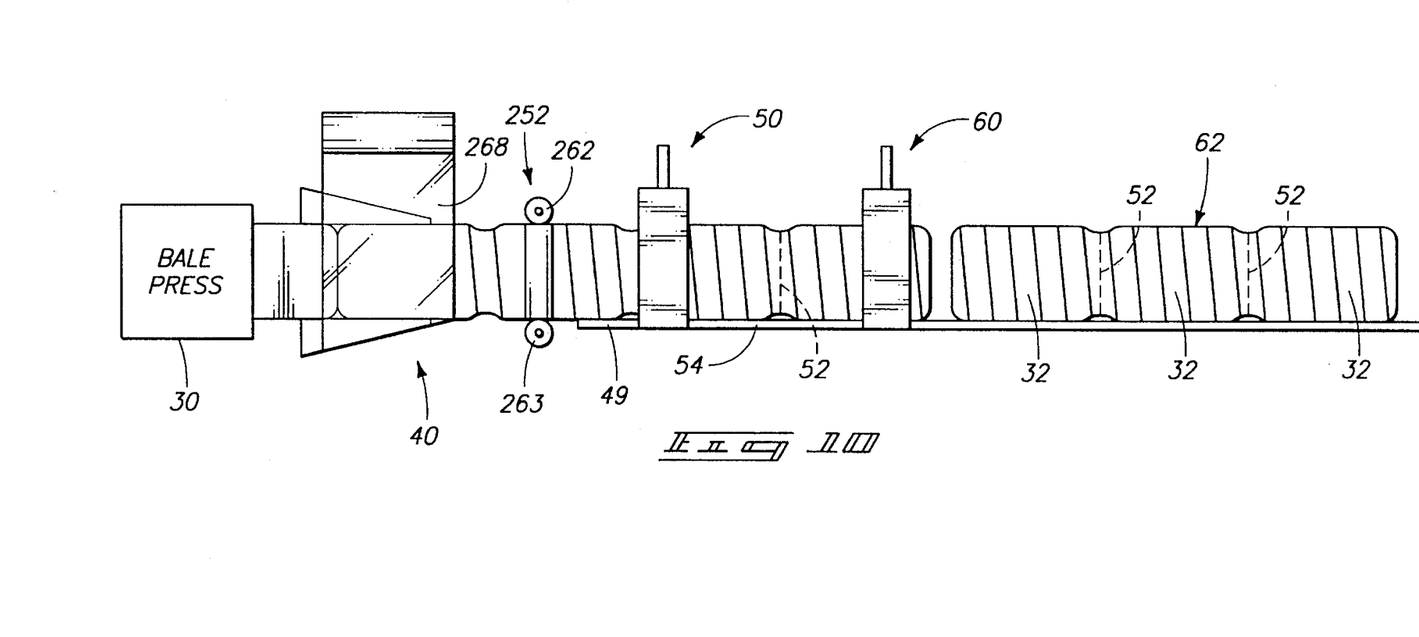
FIG. 10 is a diagrammatic illustration of the FIG. 9 system.

FIGS. 9 and 10 illustrate a system 250 for packaging bales of hay according to another preferred embodiment of this invention. System 250 is identical to system 20, discussed above with reference to FIGS. 1 and 2, but further includes a pressing machine 252 downstream from wrapper 40. Pressing machine 25 is preferably upstream of the partial and full cutting machines 50 and 60. Pressing machine 252 is designed to squeeze the wrapped hay bales after they leave wrapper 40. The purpose of this post-wrap pressing process is twofold. First, the multiple layers of material are squeezed together and against the hay bales to remove air pockets trapped between adjacent layers that were formed during the wrapping process. Second, the pressure applied to the multiple layers essentially bonds the layers together to yield a mutli-ply wrap that is less likely to unravel.

Figure 11:
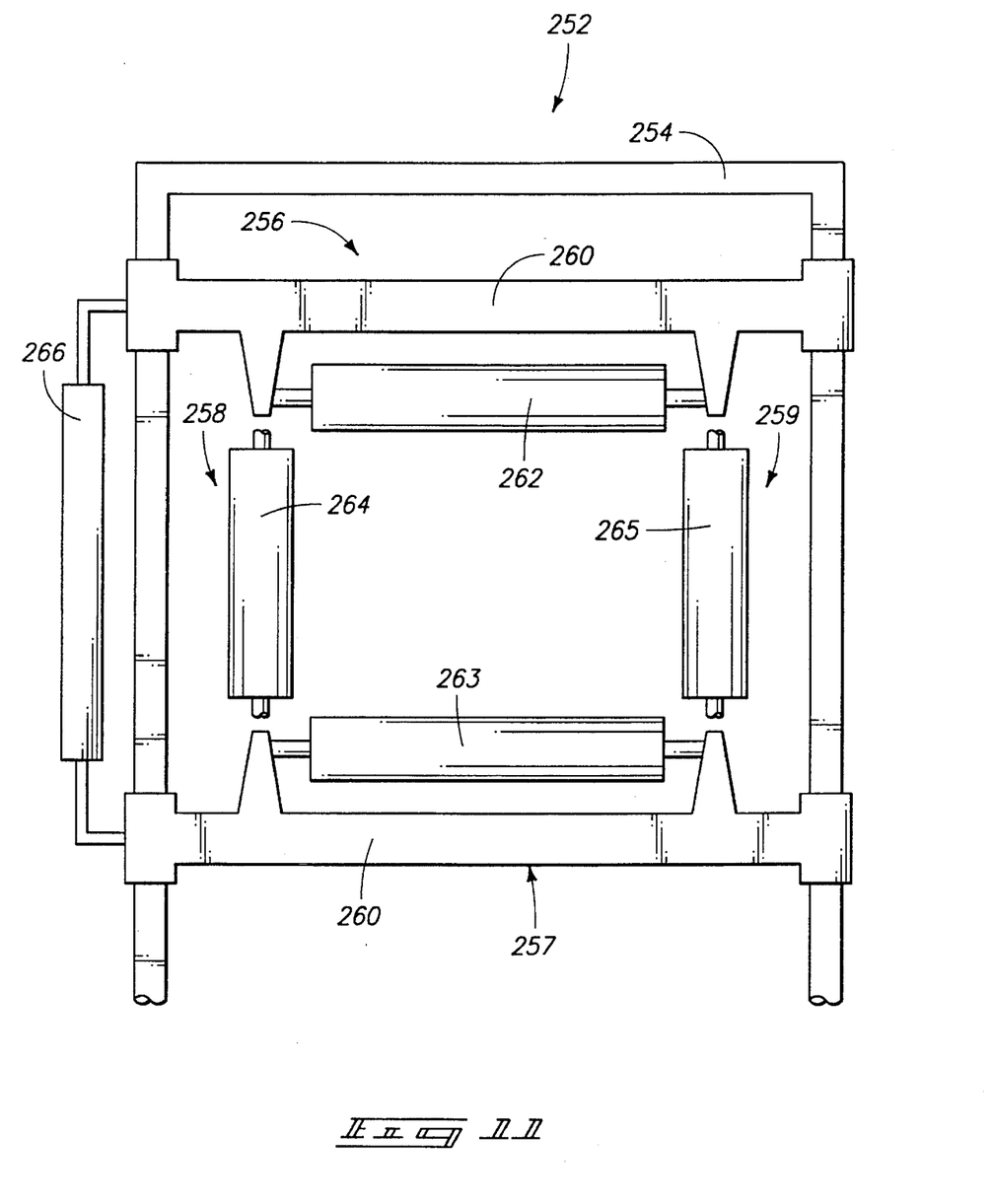
FIG. 11 is a diagrammatic front elevational view of a pressing apparatus used in the FIG. 9 system.

FIG. 11 illustrates one preferred embodiment of pressing machine 252. It includes a frame 254 and four movable roller assemblies 256–259. Individual roller assemblies have a pressure roller rotatably mounted to an adjustable cross member 260 (the cross members for the side rollers are not shown for purposes of clarity). Roller assemblies 256–259 operate in tandem whereby a first pair of pressure rollers apply opposing inward forces along the vertical coordinate and a second pair of pressure rollers apply opposing inward forces along the horizontal coordinate. The first pair has an upper pressure roller 262 positioned above the wrapped hay bales and a lower pressure roller 263 positioned beneath the hay bales. The second pair consists of a left pressure roller 264 and a right pressure roller 265.

A dynamic tensioning mechanism 266, such as a spring, is employed to urge the opposing pressures rollers together. The opposing roller assemblies 256 and 257 can both be free to move along the frame, or one roller assembly (e.g. lower roller assembly 257) can be fixed to the frame with the opposing roller assembly (e.g. upper roller assembly 256) being free to float up and down relative the fixed assembly. The dynamic tensioning member is calibrated to produce the desired pressing force between the roller pairs. An alternative construction is to adjust one or both cross members in each pair of roller assemblies to a spacing that will impart the prescribed pressure on the wrapped hay bales, and then secure the cross members to the frame at those locations via bolts, screw-type devices, or releasible locking mechanism.

With reference once again to FIG. 10, another aspect of system 250 concerns the use of wider material 268. The wider material effectively covers an entire hay bale with each rotation. Compressed hay bales have a length of approximately 16" to 22". An example width of material 268 is 24", which can be stretched down via the prestretching rollers on the wrapping wheel to be identical with the length-wise dimension (16"–22") of the individual bales.

In compliance with the statute, the invention has been described in language more or less specific as to structural and methodical features. It is to be understood, however, that the invention is not limited to the specific features described and shown, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A system for packaging bales of hay comprising:

a wrapping machine having a conduit through which hay bales are extruded along a feed axis, the wrapping machine having means for wrapping multiple layers of material around the hay bales as the hay bales are extruded through and out of the conduit, the wrapping machine applying the layers of material to successive hay bales such that the material extends between adjacent wrapped hay bales; and a pressing machine provided downstream of the wrapping machine to receive the wrapped hay bales, the pressing machine physically engaging and mechanically pressing against the layers of material and hay bales, squeezing the layered material together and against the hay bales to remove air pockets formed between adjacent layers of material.

2. A system according to claim 1 wherein the pressing machine comprises:

a first pair of pressure rollers having an upper pressure roller positioned above the wrapped hay bales and a lower pressure roller positioned beneath the wrapped hay bales, the first pair of pressure rollers applying opposing forces to squeeze the wrapped hay bales along a first coordinate; and a second pair of pressure rollers having a pressure roller positioned to the left of the wrapped hay bales and another pressure roller positioned to the right of the wrapped hay bales, the second pair of pressure rollers applying opposing forces to squeeze the wrapped hay bales along a second coordinate substantially perpendicular to the first coordinate.

3. A system according to claim 1 further comprising:

a partial cutting machine provided downstream of the wrapping machine to receive the wrapped hay bales, the partial cutting machine forming a succession of slits along a line transverse to the feed axis through portions of the layered material between adjacent wrapped hay bales to provide a detachable seam between individual hay bales.

4. A system according to claim 1 further comprising:

a full cutting machine positioned downstream of the wrapping machine, the full cutting machine completely cutting the layered material between selected pairs of adjacent wrapped hay bales.

5. A system according to claim 4 wherein the full cutting station comprises:

at least two movable cutting blades mounted to opposite sides of the wrapped hay bales, individual blades having jagged teeth; and means for operably moving the cutting blades toward one another from the opposite sides of the wrapped hay bales to controllably cut the layered material.

6. A system according to claim 1 wherein the conduit has tapered exterior walls.

7. A system according to claim 1 wherein the conduit comprises multiple prongs provided on multiple sides of the wrapped hay bales, individual prongs tapering in width from a first end to a second end.

8. A system according to claim 1 wherein the conduit comprises four prongs provided on four sides of the wrapped hay bales, individual prongs tapering in both thickness and width from a first end to a second end.

9. A system according to claim 1 wherein the hay bale has a length taken along the feed axis; and the conduit is dimensioned to extend along the feed axis at least approximately 75% of the length of the hay bale.

10. A system according to claim 1 wherein the hay bale has a length taken along the feed axis; and the multiple layers of material wrapped about the bale have an overall width greater than the length of the hay bale such that ends of the bale are overlapped by the material.

11. A system according to claim 1 wherein the wrapping means comprises:

a frame;

a wheel rotatably mounted to the frame to rotate about the feed axis;

drive means for rotating the wheel;

multiple pairs of spool shafts mounted to the wheel for supporting associated spools of material; and multiple discharging roller sets for corresponding pairs of spool shafts to guide sheets of material from the associated spools toward the conduit, individual discharging roller sets having at least three rollers to prestretch the sheets of material prior to wrapping them around the hay bales.

12. A system according to claim 1 further comprising:

a press provided upstream of the wrapping machine for compressing a quantity of hay within a chamber to form individual hay bales, the press having means for transferring the compressed hay bales from the chamber to the wrapping machine where the hay bales are extruded through the conduit along the feed axis;

the hay bales at the wrapping machine being stationary during a period in which upstream hay bales are being compressed within the press chamber; and the wrapping machine continuously applying layers of material while the hay bales in the wrapping machine are stationary to apply a selected number of layers to the hay bales.

13. An apparatus for wrapping sheets of material around compressed bales of hay, comprising:

a frame;

a hollow conduit fixedly mounted to the frame, the conduit defining a passage through which hay bales are extruded along a feed axis, the conduit having four prong means for maintaining the compressed nature of the bales at a discharge end thereof provided on four sides of the hay bales, with individual prongs tapering in both thickness and width from a first end at the discharge end of the conduit to a second end downstream of the conduit discharge end;

a wheel rotatably mounted to the frame to rotate about the feed axis;

drive means for rotating the wheel;

at least one spool shaft mounted to the wheel for supporting a spool of material; and the wheel dispensing a sheet of material from the spool as the wheel rotates around the feed axis to wrap the sheet of material around the hay bales as the hay bales are extruded through the conduit.

14. An apparatus according to claim 13 wherein a hay bale extruded through the conduit has a length taken along the feed axis; and the conduit is dimensioned to extend along the feed axis at least approximately 75% of the length of the hay bale.

* * * * *